PARAMETRIC AMPLIFIERS WITH QUARTER-WAVE SPACING

Filed Aug. 31, 1967

2 Sheets-Sheet 1

INVENTOR.
COLIN STUART AITCHISON
BY
Frank R. Trifari
AGENT

INVENTOR.
COLIN STUART AITCHISON
BY
AGENT

United States Patent Office 3,375,454

Patented Mar. 26, 1968

3,375,454

PARAMETRIC AMPLIFIERS WITH QUARTER-WAVE SPACING

Colin Stuart Aitchison, Horley, England, assignor to North American Philips Company, Inc., New York, N.Y., a corporation of Delaware Filed Aug. 31, 1967, Ser. No. 664,672
Claims priority, application Great Britain, Sept. 1, 1966, 38,999/66
3 Claims. (Cl. 330—4.9)

ABSTRACT OF THE DISCLOSURE

The gain-bandwidth factor of a diode parametric amplifier system is increased by providing two diode parametric amplifiers having their signal input ports interconnected by a transmission line section that is one quarter wavelength long at the signal frequency.

This invention relates to diode parametric amplifiers, hereinafter referred to as paramps, and is directed towards the provision of a wide-band arrangement.

According to the present invention a diode parametric amplifier arrangement comprises two individual diode paramps having their signal-input ports connected together by a transmission-line section which is one quarter-wavelength long at the signal-input frequency, together with means to apply an input signal to one of the said input ports.

As such a double paramp system can be treated, as a whole, in the same manner as an ordinary diode paramp, it is clear that it could be combined with a further diode paramp—which may itself be a double paramp—to provide a system comprising three or more individual paramps.

Embodiments of the invention will now be described with reference to the accompanying diagrammatic drawings wherein.

Figure 1:
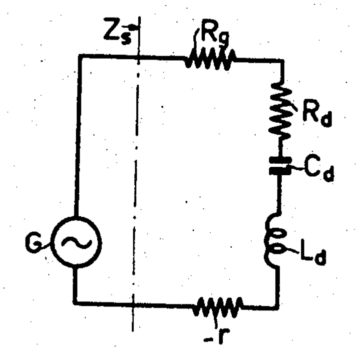
FIGURES 1 to 5 illustrate stages in the development of the invention.

Before describing an embodiment of the invention, it is convenient to consider its development from a single paramp. Referring to FIGURE 1, this shows an equivalent-circuit diagram of a simple diode paramp connected to a signal source. G having an internal impedance $R_g$. The paramp itself may be represented by circuit elements $R_d$, $C_d$, $L_d$, together with a negative resistance $r$ which represents the negative resistance produced by the paramp in operation, that is to say, when it is being pumped. If we measure the impedance presented in operation by this paramp at the signal frequency, as indicated by $Z_s$ in FIGURE 1, we will obtain the usual resonance peak which is associated with any series circuit comprising inductance, capacitance and resistance: for a circuit of this simple type the gain/bandwidth relationship can be expressed as $$G^{1/2}B=K \qquad \text{(i)}$$

where K is constant.

Figure 2:
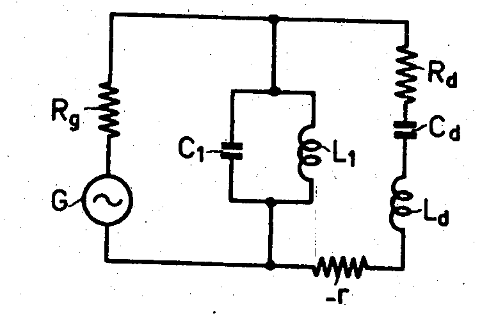

Consider now the development of this basic circuit illustrated in FIGURE 2: here, a parallel arrangement C1, L1 is placed across the diode and is so dimensioned as to be resonant at the signal frequency. Preferably, the Q of the parallel circuit formed by $R_g$, C1 and L1 is adjusted by variation of C1 and L1 so that the rate of change of reactance of the equivalent series circuit of these components is equal and opposite to the rate of change of reactance of $C_d$ and $L_d$. This circuit of FIGURE 2 can conveniently be represented in the manner illustrated in FIGURE 3 where the diode components are illustrated at the right hand portion of the figure and where at the left hand portion of the figure we have a resistance $R(\omega)$ and a reactance $X(\omega)$. Here, $R(\omega)$ is a frequency-dependant resistance which is a function of $R_g$, C1 and L1 of FIGURE 2, whilst $X(\omega)$ similarly is a function of $R_g$, C1 and L1.

Figure 3:
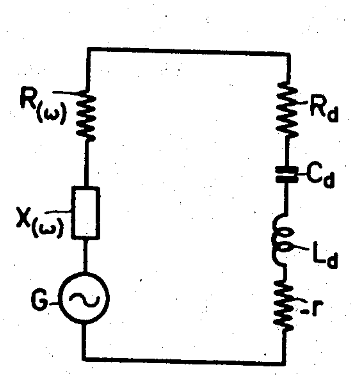
Figure 4:
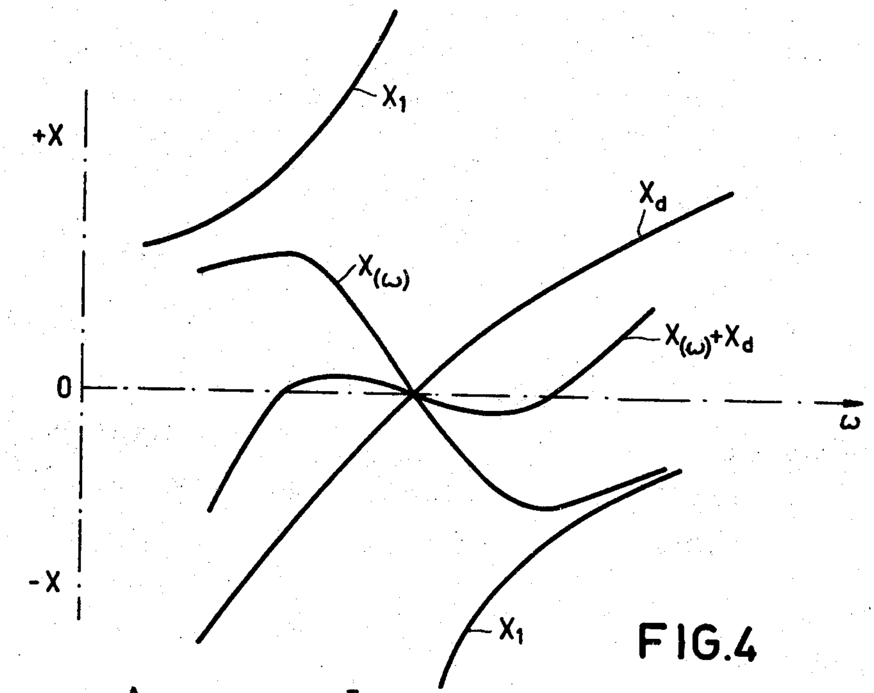

This conception of increasing the bandwidth by the provision of a shunt time-circuit, in the manner outlined above, may be illustrated by the reactance/frequency curves of FIGURE 4 which shows at X1 the reactance of L1, C1, and at $X_d$ the reactance provided by the paramp circuit-elements $L_d$ and $C_d$. The effect of $X(\omega)$ in FIGURE 3 yields a curve indicated by $X(\omega)$ and FIGURE 4 also shows the final curve obtained by adding the curve $X_d$ for the paramp to that for the compensating circuit $X(\omega)$ so as to yield a characteristic of $X(\omega)+X_d$. This final curve is a measure of the response of the whole circuit and it can be seen that it is a curve of a third-order expression in $\omega$ and provides a reduced reactance change over an appreciable bandwidth.

For a configuration such as that illustrated in FIGURES 3 and 4 the gain/bandwidth characteristic can be denoted by the expression $$G^{1/4}B=K \qquad \text{(ii)}$$

where K again is a constant which is substantially the same as in expression (i), but may be slightly different.

Figure 5:
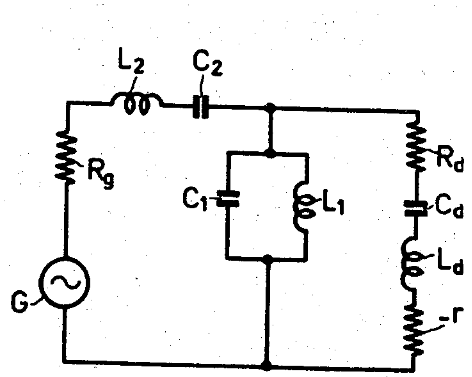

This technique is susceptible to further application by applying a series tuned reactance circuit L2, C2, see FIGURE 5, which again is resonant at the signal frequency and preferably has a circuit magnification Q which is adjusted so as further to reduce the reactance change over a desired bandwidth. The gain/bandwidth relationship may here be expressed as $$G^{1/6}B=K \qquad \text{(iii)}$$

Figure 6:
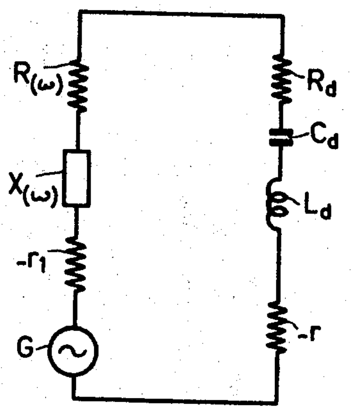
FIGURE 6 illustrates an equivalent-circuit diagram illustrating the principles of the invention.

Consider again, the circuit illustrated in FIGURE 2 and let us now pump the capacitor C1, in addition of course to the pumping already being effected to $C_d$, that is to say let C1 be part of a separate diode paramp not shown in FIGURE 2 and having its own idling circuit. The circuit may now be represented by the arrangement illustrated in FIGURE 6 which is very similar to that of FIGURE 3 but which includes a further negative resistance $r1$ which represents the input impedance presented by the parametric amplifier which has been substituted for, or which forms part of, the resonant circuit C1, L1 in FIGURE 2. This complete system yields a gain/bandwidth characteristic which can be expressed by $$G^{1/4}B=2K \qquad \text{(iv)}$$

and it will be noted that the theoretical gain/bandwidth expression is now doubled in value so that for a given gain the bandwidth itself is doubled.

Figure 7:
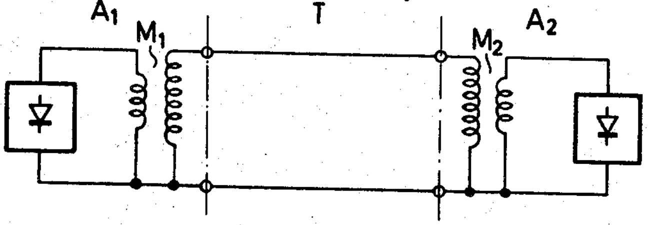
FIGURE 7 is an equivalent-circuit diagram illustrating an embodiment of the invention, and FIGURE 8 further illustrates the embodiment.

FIGURE 7 is an equivalent-circuit diagram of a parametric amplifier system incorporating two separate pumped paramps. Here, a paramp A1 is connected through an impedance-transforming section M1 to a transmission line T and the other end of the transmission line is connected to a second paramp A2 which also incorporates an impedance transforming section M2. Now, if the transmission line section T is made one quarter-wavelength long at the signal frequency then at this frequency the impedance presented at its output terminals by either of the paramps A1 anud A2 will be transformed by the section T and will appear, at the terminals of the other paramp, in its transformed condition. Thus, if one paramp presents at its output terminals the characteristics of a series-resonant circuit, then at the terminals of the other paramp it will appear to present the characteristics of a parallel-resonant circuit. Given this condition, then we can see that at the terminals of paramp A1 we can envisage a series-resonant circuit as shown in FIGURE 2, comprising resistance, capacitance and inductance $(R_d - r)$, $C_d$ and $L_d$ respectively, whilst paramp A2 will appear as a pumped parallel-resonant circuit, C1, L1 in FIGURE 2, connected across the series-resonant circuit represented by A1.

Figure 8:
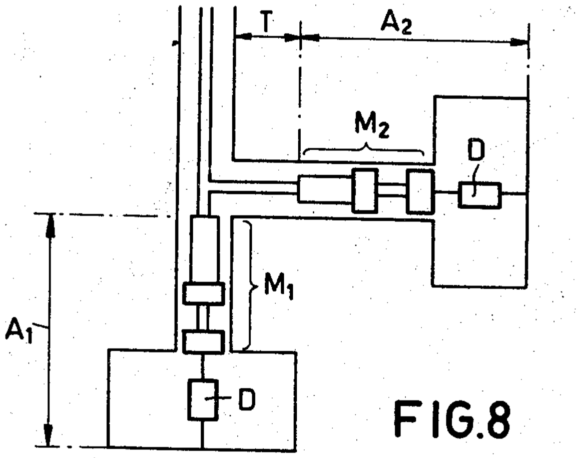

Such an arrangement is illustrated in diagrammatic form in FIGURE 8. Here, a paramp, A1 comprises an impedance-transforming section M1 through which a signal is applied to a varactor diode D. The impedance-transforming section M1 suitably includes the usual low-pass filter. A second paramp A2 is constructed in a similar manner and again comprises an impedance-transforming arrangement M2 and a diode D. The paramps A1 and A2 may, alternatively, each comprise two diodes connected with opposite polarities between the low pass filter and the waveguide wall. In this arrangement each diode is series resonant at the idler frequency, and completes the series resonant circuit of the other diode in the respective paramp, in order to form a loop circuit resonant at the idler frequency. The two paramps are connected together by a coaxial transmission line section T which is one quarter-wavelength long at the signal frequency and from the output port of paramp A2, that is to say at the left hand end of the line T in FIGURES 6 and 7, a coaxial line leads to the signal source. In FIGURE 7 the distance between the end of the impedance-transforming section M1 and the junction of the centre conductor with the centre conductor of the line T is necessarily exaggerated for the sake of clarity: in fact, of course, this distance will not be more than the distance between the inner and outer conductors of the transmission line T so that the transmission line will effectively be connected to the input port of the paramp A1 without any significant intervening line.

The complete arrangement of a double paramp system illustrated in FIGURE 7 has the general characteristics of a diode paramp and can be treated as an ordinary paramp so that it is possible to repeat the "doubling up" process and provides a system having three separate paramps where two of them are connected as in FIGURE 7 and then are connected through a further quarter-wavelength section to the third paramp to which the signal is applied. Of course, this third paramp may itself take the form of a double paramp as illustrated in FIGURE 7 and in theory this process can be continued indefinitely.

What I claim is:

1. A diode parametric amplifier system comprising first and second individual single-port diode paramps, a transmission line section interconnecting the signal-input ports of said first and second paramps, said transmission-line section having such a length at the signal-input frequency that a series-resonant circuit characteristic at one end of the transmission-line section appears at the other end thereof as a parallel-resonant circuit characteristic, means to apply an input signal to one of the said input ports, and means to derive an output signal from the same one of said ports.

2. The parametric amplifier system of claim 1 in which said transmission line section has a length of substantially one quarter wavelength at the frequency of said input signal.

3. The parametric amplifier system of claim 1 in which said first diode paramp is comprised of third and fourth diode parametric amplifiers having their signal input ports interconnected by a transmission line section that is substantially one-quarter wavelength long at the frequency of said input signal.

References Cited

UNITED STATES PATENTS

| | | | |
|---|---|---|---|
| 3,175,164 | 3/1965 | Schreiner | 330—4.9 |

FOREIGN PATENTS

| | | |
|---|---|---|
| 715,199 | 8/1965 | Canada. |

ROY LAKE, *Primary Examiner.*

D. R. HOSTETTER, *Assistant Examiner.*